United States Patent
Oppizzi

(10) Patent No.: US 8,823,315 B2
(45) Date of Patent: Sep. 2, 2014

(54) PORTABLE SELF-CONTAINED PHOTOVOLTAIC SOLAR DEVICE

(75) Inventor: Daniele Oppizzi, Neuchatel (CH)

(73) Assignee: Daniele Oppizzi, Neuchatel (CH)

( * ) Notice: Subject to any disclaimer, the term of this patent is extended or adjusted under 35 U.S.C. 154(b) by 890 days.

(21) Appl. No.: 12/894,447

(22) Filed: Sep. 30, 2010

(65) Prior Publication Data

US 2011/0017262 A1    Jan. 27, 2011

Related U.S. Application Data

(63) Continuation of application No. PCT/EP2008/067533, filed on Dec. 15, 2008.

(30) Foreign Application Priority Data

Apr. 1, 2008 (CH) .......................................... 481/08

(51) Int. Cl.
*H01M 10/44* (2006.01)

(52) U.S. Cl.
USPC .......................................... 320/101; 323/906

(58) Field of Classification Search
USPC .................................. 320/101, 107; 323/906
See application file for complete search history.

(56) References Cited

U.S. PATENT DOCUMENTS

| | | | | |
|---|---|---|---|---|
| 4,636,579 A | * | 1/1987 | Hanak et al. .................. | 136/245 |
| 4,782,432 A | * | 11/1988 | Coffman ....................... | 362/184 |
| 5,452,194 A | * | 9/1995 | Phalen .......................... | 362/376 |
| 5,605,769 A | | 2/1997 | Toms | |
| 6,380,710 B1 | * | 4/2002 | Watanabe et al. ............. | 320/101 |
| 6,547,066 B2 | * | 4/2003 | Koch .......................... | 206/308.1 |
| 7,775,691 B2 | * | 8/2010 | Burgei et al. .................. | 362/386 |
| 7,825,325 B2 | * | 11/2010 | Kennedy et al. .............. | 136/244 |
| 8,058,840 B2 | * | 11/2011 | Daniel et al. ................... | 320/112 |
| 2006/0028166 A1 | * | 2/2006 | Closset et al. ................. | 320/101 |
| 2007/0273327 A1 | * | 11/2007 | Daniel et al. ................... | 320/110 |
| 2008/0079368 A1 | * | 4/2008 | Kennedy et al. .............. | 315/158 |
| 2009/0040749 A1 | * | 2/2009 | Burgei et al. .................. | 362/183 |
| 2010/0259220 A1 | * | 10/2010 | Crawford et al. ............. | 320/116 |

FOREIGN PATENT DOCUMENTS

| | | |
|---|---|---|
| EP | 0987784 A2 | 9/1999 |
| EP | 1818605 A2 | 8/2007 |
| WO | 2004/077576 A1 | 9/2004 |
| WO | 2004077576 A1 | 9/2004 |
| WO | 2004077577 A1 | 9/2004 |
| WO | WO 2004077576 A1 * | 9/2004 |

OTHER PUBLICATIONS

Office Action dated May 17, 2012 for Chinese patent application 200880129596.8.
International Search Report for PCT/EP2008/067533 dated Aug. 26, 2010.

* cited by examiner

*Primary Examiner* — Drew A Dunn
*Assistant Examiner* — David Henze-Gongola
(74) *Attorney, Agent, or Firm* — Pearne & Gordon LLP

(57) ABSTRACT

A portable self-contained photovoltaic device is provided with a hollow cylindrical support in two substantially coaxial portions assembled to one another. The device further includes a rolled flexible photovoltaic collector and a battery mounted in the first portion of the coaxial portions and designed to store electric energy produced by the photovoltaic collector. An electronic control circuit is mounted in the first portion for managing the charging of the battery. Several LED lamps are stored inside the photovoltaic collector and placed inside the second portion of the coaxial portions.

20 Claims, 6 Drawing Sheets

PORTABLE SELF-CONTAINED PHOTOVOLTAIC SOLAR DEVICE

REFERENCE DATA

This application is a continuation of International application PCT/EP2008/067533 filed on Dec. 15, 2008, the content whereof is hereby incorporated. It claims priority of Swiss application No. CH08/00481 filed on Apr. 1, 2008, the content whereof is hereby incorporated.

TECHNICAL FIELD

The present invention relates to a portable self-contained photovoltaic device, in particular but not exclusively a lighting system powered by a photovoltaic collector.

PRIOR ART

The prior art discloses outdoor lamps associated with a photovoltaic collector and a battery. The battery is recharged during the day in order to power the lamp during the night. These devices are often relatively compact and comprise a single lamp or a single reflector. Several lamps of this type are necessary to light up a considerable area, which multiplies the number of batteries and of regulators that are necessary, and therefore the cost of the whole system.

Also known are larger lighting installations comprising photovoltaic collectors, a battery of the motor-vehicle type, a regulator and a more powerful lamp. These installations are often fixed. The weight of the battery and the large number of separate components in all cases make these installations difficult to transport.

BRIEF SUMMARY OF THE INVENTION

One object of the present invention is to propose a new photovoltaic device that can be transported but is nevertheless suitable for lighting a large area.

According to the invention, these objects are achieved notably by means of a portable self-contained photovoltaic device comprising:

a hollow support in two substantially coaxial portions assembled to one another;

a rolled flexible photovoltaic collector;

a battery mounted in the first portion of said portions and designed to store the electric energy produced by said photovoltaic collector;

an electronic control circuit for managing the charging of the battery, mounted in said first portion;

a lighting system comprising several LED lamps stored inside said rolled photovoltaic collector and inside the second portion of said portions.

This device notably has the advantage of combining in a single support all the components necessary for the production and storage of electricity and for the use of this electricity to power several lamps. The device is advantageously self-contained and able to be carried by a single person of adult size. The photovoltaic solar device is therefore made up of a set of parts assembled together, adapted to one another, and allowing optimal storage.

The use of a preferably cylindrical or optionally parallelepipedal support makes it possible to optimize the storage of the flexible solar panel which can simply be rolled up. The other components of the device, notably the lamps and the optional pump, are stored inside the rolled-up panel, or at the end of the panel like the batteries and the electronic circuit.

It is therefore possible to have, in a single compact, cylindrical and therefore easy-to-carry on the shoulder device, a solar panel of large dimensions with all the components necessary for the assembly of a complete photovoltaic system with several lamps.

BRIEF DESCRIPTION OF THE FIGURES

Examples of application of the invention are indicated in the description illustrated by the appended figures in which.

EXAMPLE(S) OF EMBODIMENT OF THE INVENTION

Figure 1:
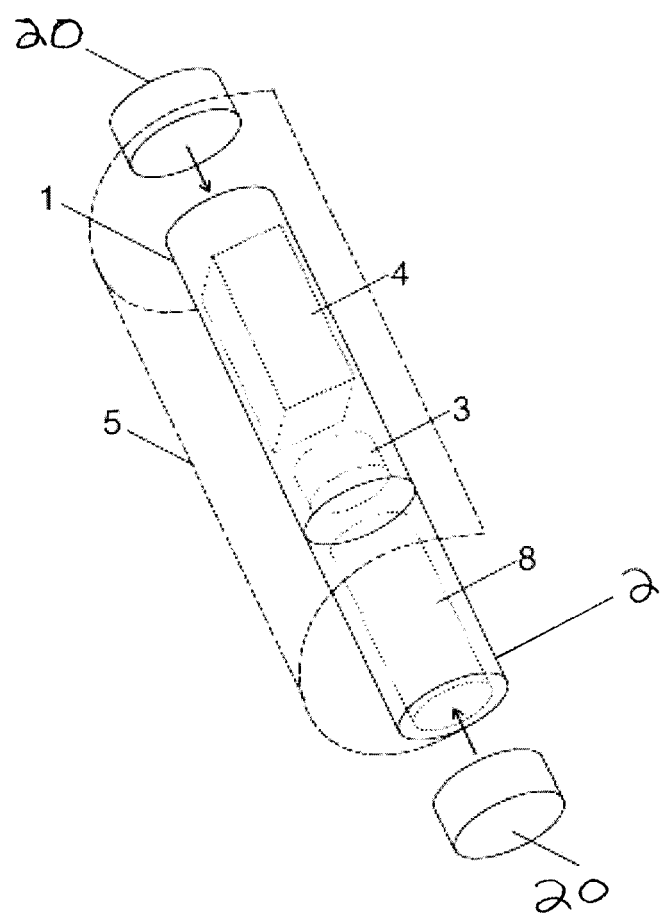
FIG. 1 illustrates schematically a device according to a first variant of the invention.

FIG. 1 illustrates schematically a device according to a first variant of the invention. The device comprises a cylindrical support in two portions 1 and 2. The support is preferably cylindrical or parallelepipedal and the two portions 1, 2 are fitted or screwed coaxially into one another. The support may be manufactured in molded or in injected plastic, in metal or in another flexible material that is resistant to impacts, to deformations and to heat, and insensitive to oils and solvents.

This support forms a sealed storage space for various elements of the device, notably a battery 4, an electronic circuit 3 for controlling the charging of the battery and a lighting device comprising several lamps 8, preferably LED lamps. The support may be closed by a removable lid 20 sealed at one end or at each end. Cables for electrically connecting these components can be stored in the support.

The battery 4 consists of a set of electric accumulators connected together so as to create a generator of direct current delivering the desired voltage and current. It is also possible to use a starter, that is to say a system for storing energy of high power capable of supplying the energy power necessary to start machines such as hydraulic pumps. A starter makes it possible to deliver the electric power more rapidly than a conventional battery. If the device is used to operate a hydraulic pump, it is for example possible to start the pump with the energy supplied by the starter; once starting is finished, the control electronics automatically switches the battery which takes over after the starter in order to power the pump during normal operation.

The electronic circuit 3 manages the charging and discharging of the battery and makes it possible to prevent premature aging of the battery. If the system malfunctions, the control electronics 3 notably prevents the battery from discharging completely which would make it unusable. The electronics can also manage the lighting system or the system for charging electric or electronic apparatus and an optional starter.

The lighting 8 is based on LEDs (light-emitting diodes) with a power of 1 watt or of several watts. Each LED is advantageously furnished with a lens in order to make the light rays converge or diverge. Several LEDs are advantageously connected to one another in order to produce the necessary light. The assembly is placed in a case which can be used as a spot or as a conventional lamp.

The device of FIG. 1 also comprises a supple and flexible photovoltaic collector rolled in this example around the support. The collector is preferably produced from a roll from a plastic support that is flexible and cut to the desired length. A strap or a velcro fastener (not shown) makes it possible to keep the collector rolled up when carried. The photovoltaic cells are preferably placed on the inner face of the rolled-up collector. The inner end of the collector can be connected permanently to the support or to one of the portions 1, 2 of the support, which thus serves as a base during the installation of the deployed collector. To make the photovoltaic collector self-supporting when it is deployed, the device may comprise a structure that frames it and makes it rigid after assembly.

The device may also comprise sockets or plugs allowing the charging of connected electric or electronic apparatus. It is possible to provide sockets dedicated to one or more manufacturers and/or universal sockets to which the manufacturer-dedicated sockets can be connected.

Figure 2:
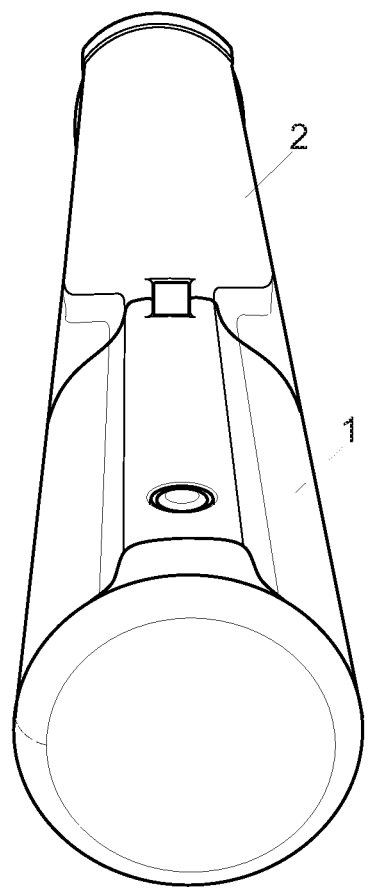
FIG. 2 illustrates in perspective a device according to a second variant of the invention.

FIGS. 2 to 6 illustrate a second variant of a photovoltaic device according to the invention, in which the flexible photovoltaic panel is rolled up inside the support. FIG. 2 illustrates a view in perspective of the support in two portions 1, 2 closed for carrying. The typical length of the support is of the order of 100 to 120 centimeters and its diameter is approximately 15 to 20 centimeters, sufficient to store a solar collector of approximately 0.8 to 1.2 meters square and the other elements of the device. The support can preferably stand upright on its own or be laid down; feet or a shoulder (not shown) can be provided to keep the cylinder down and prevent it from rolling.

Figure 3:
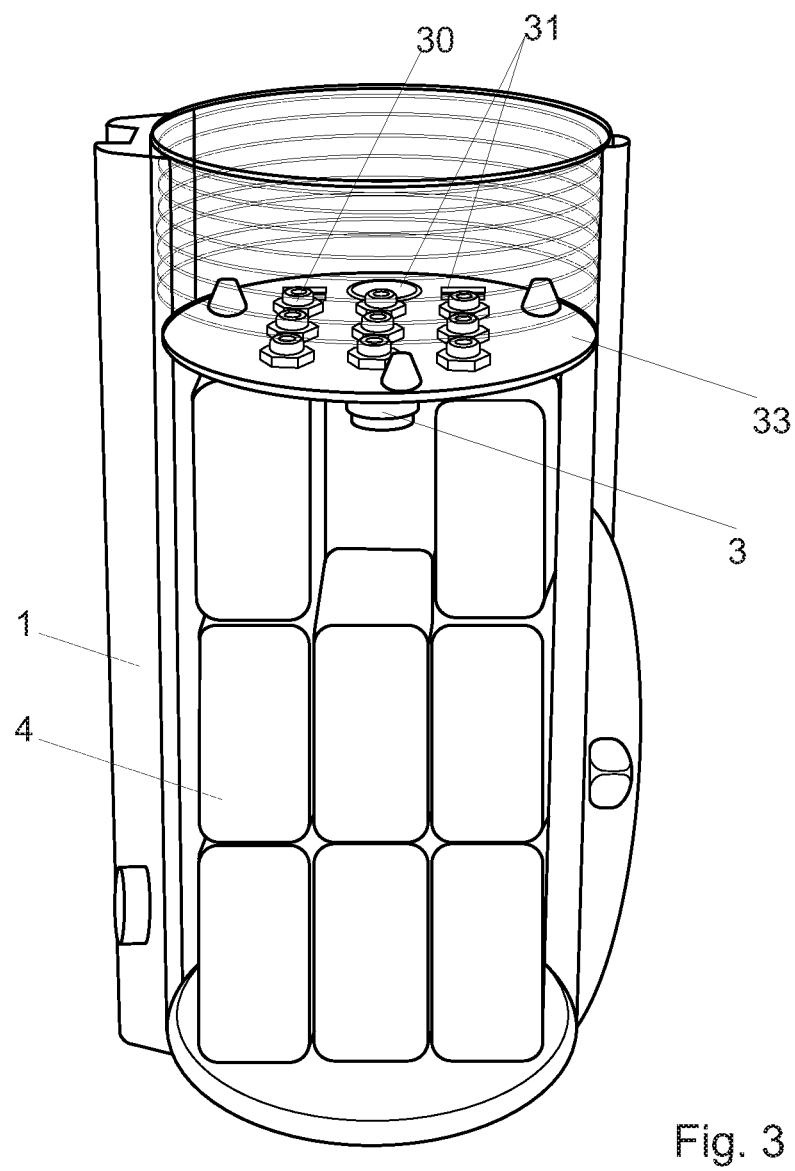
FIG. 3 illustrates in perspective the first portion of the support according to the second variant of the invention.

FIG. 3 illustrates a view in perspective of the first portion 1 of the support, shown transparently in order to show the battery 4, the electronic control circuit 3 for the management of the charging of the battery, the connectors 30 for the cables 9 for connecting to the panel and to the lamps, and the connectors 31 or plugs for the recharging of electric or electronic apparatus. The batteries 4 are preferably mounted on the bottom of the portion 1 and enclosed by a removable board supporting the connectors 30, 31 and the electronic circuit 3. The electronic circuit 3 also comprises transformers or voltage converters in order to supply the voltage levels appropriate to the various connectors.

The removable board 33 is preferably mounted so as to be set back in the portion 1, leaving a cylindrical space for storing the end of the collector and of the storage case described below. It can be removed, for example with the aid of screws, in order to replace the battery. The electronic circuit 3 is preferably mounted on the lower face of the removable board 33 while the upper face comprises several connectors 31 so that the removable cables 9 making it possible to link the electronic circuit 3 to the solar panel 5 on the one hand and to the lamps 8 on the other hand can be connected thereto. Other connectors or plugs 32 can also be provided on the upper face of the board 33, for example connectors of the cigarette lighter, USB types etc. Other control members, for example switches, input and output fuses, lamps or displays for control or for displaying the state of charge of the battery, etc., can also be mounted on the upper outer face of the board 33.

In a variant not shown, two distinct boards are provided above the batteries 4: a first printed circuit board 33 supporting the electronic circuit, and an additional board superposed over this printed circuit and supporting the connectors. The upper board can be a simple plastic or aluminum board and does not need printed tracks; the connectors are linked to the lower board by cables or discrete wires. The boards can be sunk inside the cylinder and held by their periphery and pressing against a bearing surface not shown inside the cylinder; a seal can be used optionally to seal them. It is also possible to provide an annular ring screwed inside the cylinder to hold the board or boards 33 against this bearing surface.

Figure 4:
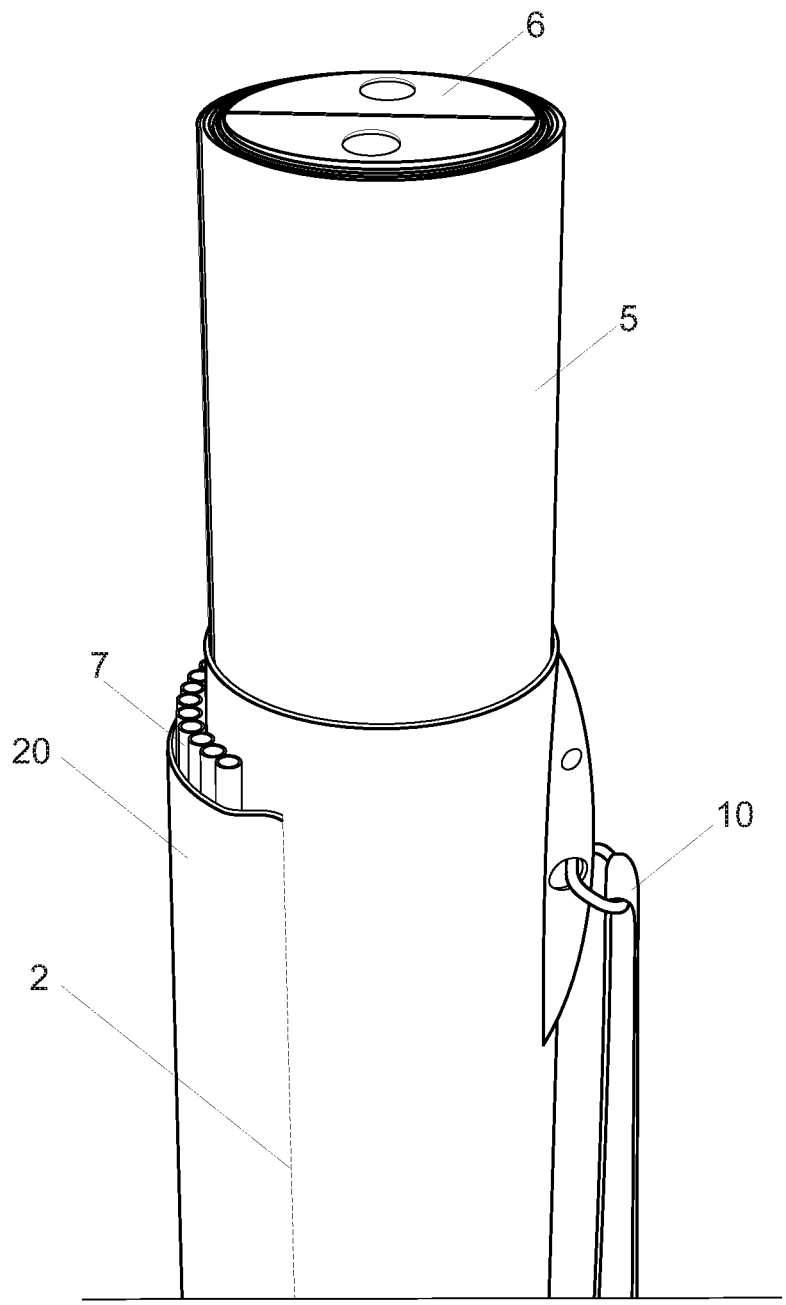
FIG. 4 illustrates in perspective the second portion of the support according to the second variant of the invention.

The second portion 2 of the support is illustrated in FIG. 4. The two portions 1, 2 are intended to be assembled coaxially to one another, for example by screwing them, by clipping them, with a bayonet assembly, or simply by inserting one portion into the other. The connection between the two portions 1, 2 is preferably sealed or at least protected against liquid splashes.

The second support portion 2 is intended for storing the flexible solar panel 5 rolled up inside the support. A portion of this panel protrudes out of the tube and is intended to be housed in the free cylindrical space in the first portion 1 of the support. This portion can be closed on one side by a screwed or bonded lid.

Mounting rods 7 are stored in a pocket 20 outside the support, for example a pocket made of the same material as the support and bonded against the outer face of the support after the injection of the latter. In another variant, the tube is manufactured by extrusion of a ceramic or aluminum material; in this case, the pocket 20 is advantageously extruded during the same operation. A synthetic sheathing can be provided around the extruded aluminum tube.

Figure 6:
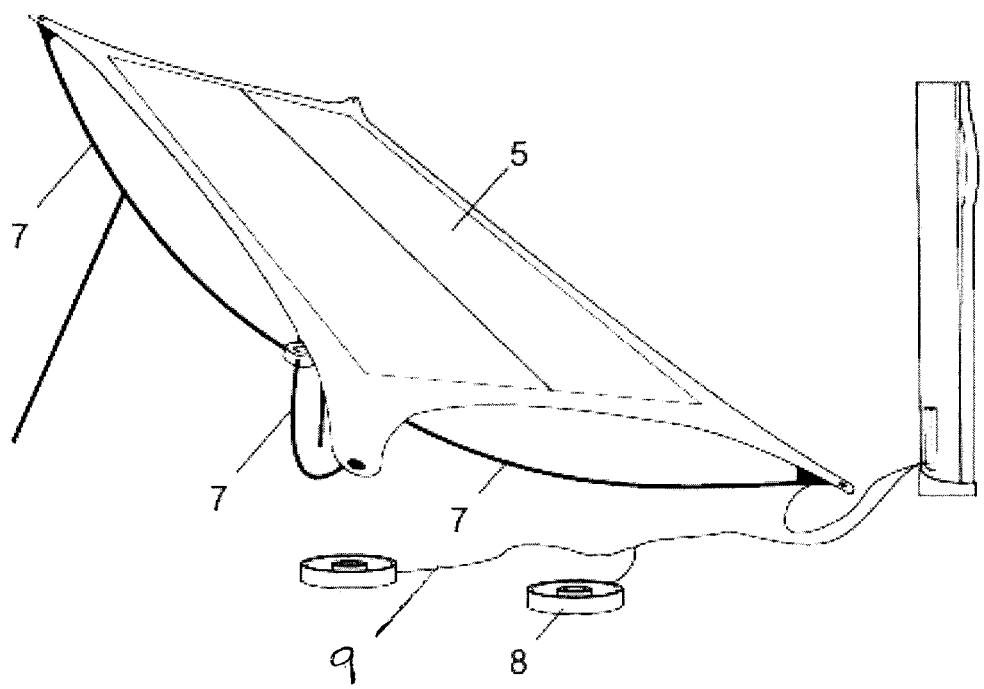
FIG. 6 illustrates in perspective the device according to the second variant of the invention, during use.

These flexible rods, for example made of glass fiber, are intended to be assembled in order to mount and stiffen the solar panel, as illustrated in FIG. 6. The second portion also comprises a handle or, as in the example illustrated, a strap 10 for carrying the folded device.

Figure 5:
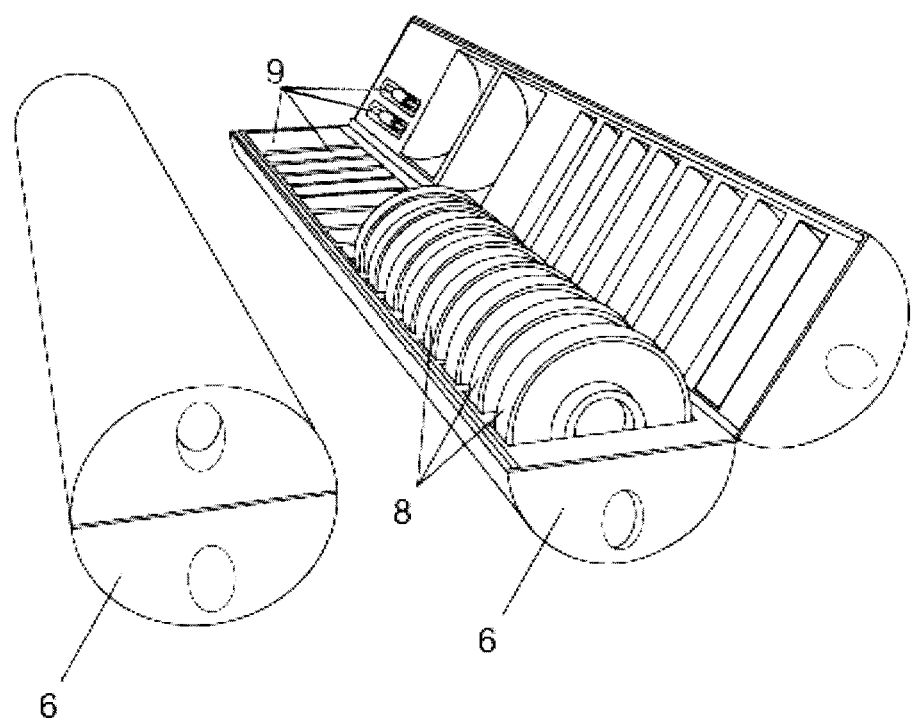
FIG. 5 illustrates in perspective the case for storing the lamps and the cables according to the second variant of the invention.

The second portion 2 of the support also comprises a storage case 6 for storing the lamps 8 and the cables 9. An example of a case is illustrated in FIG. 5, closed and then open. In this embodiment, the case is formed of two semicylindrical portions assembled so as to form a cylinder that can be stored inside the rolled-up panel 5. Various lamps 8 (eight lamps in this example) are stored coaxially in appropriate storage spaces in the base of the case. Other storage spaces are also provided for the connection cables 9. The semicylindrical base closes over the lid. The case is intended to be stored in the sealed support and therefore does not need to be sealed itself.

Other devices can be stored in the case 6, for example a starter, a hydraulic pump etc.

The dimensions of the various elements are carefully selected so as to be adapted to one another. For example, the outer diameter of the lamps makes it possible to store them in the case 6 which can just be housed inside the rolled panel in the support. In the same manner, the electrical characteristics of the solar panel, of the electronic circuit, of the battery and of the lamps are perfectly adapted to one another. The device, although consisting of various parts, therefore forms a homogeneous set.

FIG. 6 illustrates schematically the device mounted with the solar collector 5 and assembled and stiffened by virtue of the rods 7, and connected by virtue of the cables 9 to the electronic circuit 3 in the first portion 1 of the support. The rods preferably allow other forms of mounting, including a mounting resting against a vertical surface, etc. Pockets or eyelets make it possible to tie the rods to the solar collector mounted, in the example illustrated, on a textile or plastic rectangular support with an ear at each corner; a rectangular support is also possible.

Reference Numbers Employed in the Figures

1 First portion of the support for housing the battery and the control electronic circuit
10 Strap
2 Second portion of the support for housing the photovoltaic collector
20 Storage space for the rods
21 Lids at each end of the support
3 Electronic control circuit for managing the charging of the battery
30 Connectors for the lamps and the panel
31 Connectors for the charging of electric or electronic apparatus
33 Removable board
4 Battery (unit for storing photovoltaic energy)
5 Rolled flexible photovoltaic collector
6 Storage case
7 Rods
8 Lighting system consisting of several lamps
9 Cables

The invention claimed is:

1. A portable self-contained photovoltaic device comprising:
a hollow cylindrical support in two portions assembled end to end, wherein the first portion is removably coupled to the second portion;
a rolled flexible photovoltaic collector;
a battery mounted in the first portion of said portions and designed to store the electric energy produced by said photovoltaic collector;
an electronic control circuit for managing the charging of the battery, mounted in said first portion;
several LED lamps stored inside said rolled photovoltaic collector and inside the second portion of said portions, wherein the lamps are stored in a rigid case.

2. The device of claim 1, also comprising removable electric cables making it possible to connect said photovoltaic collector to said electronic control circuit and said electronic control circuit to said lamps.

3. The device of claim 1, also comprising rods in order to mount and stiffen said photovoltaic collector once unrolled from the support.

4. The device of claim 1, said support being made of plastic and being sealed by a removable lid at least at one end of the support.

5. The device of claim 3, said rods being stored outside said support.

6. The device of claim 3, wherein the rods are stored in a pocket that is coupled to an outer face of the support.

7. The device of claim 1, said photovoltaic collector being rolled inside said second portion and protruding from said second portion so as to be partially engaged inside said first portion.

8. The device of claim 4, said support comprising a carrying strap or a handle.

9. The device of claim 2, said electronic control circuit being mounted on a circular board mounted removably on top of the battery in said first portion.

10. The device of claim 9, several connectors being mounted on said board in order to connect the removable cables linking the battery to the collector and in order to recharge electric or electronic apparatus.

11. A portable self-contained photovoltaic device comprising:
a hollow cylindrical support in two substantially coaxial portions assembled to one another wherein the first portion is removably coupled to the second portion;
a rolled flexible photovoltaic collector;
a battery mounted in the first portion of said portions and designed to store the electric energy produced by said photovoltaic collector;
an electronic control circuit for managing the charging of the battery, mounted in said first portion;
several LED lamps stored inside said rolled photovoltaic collector and inside the second portion of said portions, wherein the lamps are stored in a rigid case, said rigid case being formed of two semi-cylindrical portions so as to form a cylinder that can be stored inside said photovoltaic collector.

12. The device of claim 11, wherein the first semi-cylindrical portion is configured to be rotatably coupled to the second semi-cylindrical portion to allow opening and closing of the case.

13. The device of claim 11, wherein said rigid case comprises storage spaces coaxially aligned in at least the first and second semi-cylindrical portions.

14. The device of claim 13, wherein the lamps are stored coaxially in the storage spaces.

15. A portable self-contained photovoltaic device, comprising:
a hollow cylindrical support in two substantially coaxial portions assembled to one another and sealed by a removable lid at least at one end of the support, wherein the first portion is removably coupled to the second portion;
a rolled flexible photovoltaic collector being rolled inside the second portion and protruding from the second portion so as to be partially engaged inside the first portion;
a battery mounted in the first portion and designed to store the electric energy produced by the photovoltaic collector;
at least one rod configured to mount and stiffen the photovoltaic collector once unrolled from the support, wherein the at least one rod is stored outside of the support in a pocket that is coupled to an outer face of the support;
an electronic control circuit for managing the charging of the battery, mounted on a circular board removably mounted on top of the battery in the first portion, ;
a rigid case being formed of two semi-circular portions wherein a first semi-circular portion is configured to be rotatably coupled to a second semi-cylindrical portion to allow opening and closing of the case, the case comprising storage spaces coaxially aligned in at least the first and second semi-cylindrical portions;
several LED lamps stored inside the rolled photovoltaic collector and inside the second portion, wherein the lamps are stored in the storage spaces of the case; and
at least one removable electric cable configured to connect the photovoltaic collector to the electronic control circuit and the electronic control circuit to the lamps, wherein at least one connector is mounted on the circuit board and configured to connect the at least one removable electric cable linking the battery to the photovoltaic collector to recharge an electronic apparatus.

16. A portable device for storing a rolled flexible photovoltaic collector comprising:
a flexible photovoltaic collector, comprising a rolled condition and an unrolled condition;
a removable storage case about which the flexible photovoltaic collector is rolled when in the rolled condition;

a hollow cylindrical support, the hollow cylindrical support comprising a first portion, and a second portion, wherein the first portion comprises a battery, an electronic control circuit, an electronic board, and connectors, wherein the second portion is adapted to receive the removable storage case and the flexible photovoltaic collector when in the rolled condition, and wherein the first portion and the second portion are removably coupled end to end.

17. The device of claim 16, wherein the connectors are adapted to connect to an electric apparatus to provide power thereto.

18. The device of claim 16, wherein the removable storage case is adapted for storing items.

19. The device of claim 18, wherein the items include cables and lamps.

20. The device of claim 16 further comprising a pocket for storing mounting rods, the mounting rods adapted to support the flexible photovoltaic collector when in the unrolled condition.

* * * * *